T. SCOTT.
METER FOR ELASTIC FLUIDS.
APPLICATION FILED JUNE 18, 1914.
1,151,406.
Patented Aug. 24, 1915.
2 SHEETS—SHEET 1.
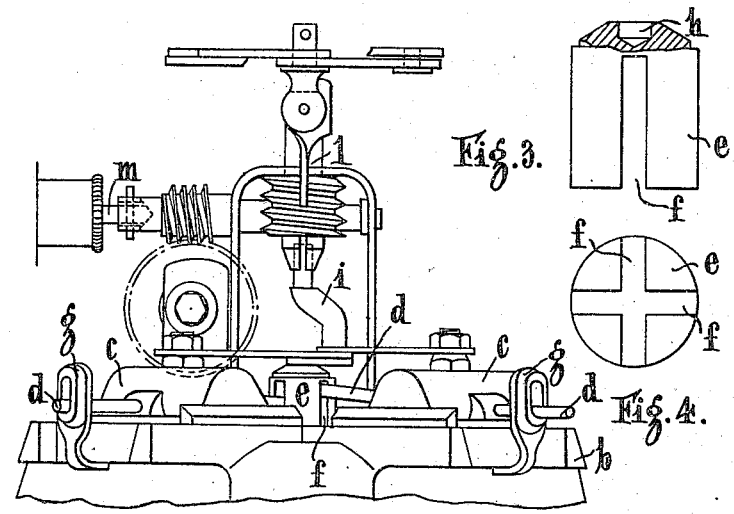
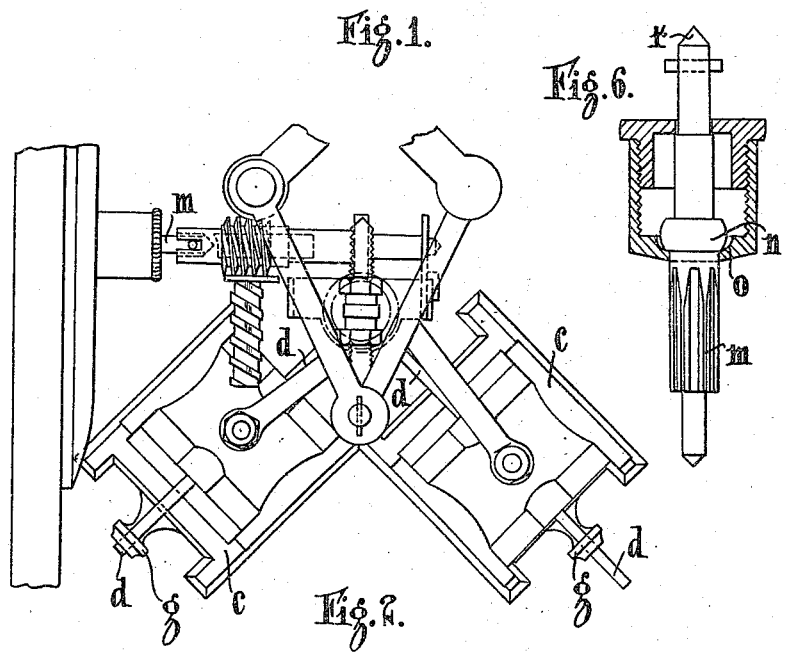
WITNESSES:
INVENTOR:
Thomas Scott,
BY
ATTORNEYS.

T. SCOTT.
METER FOR ELASTIC FLUIDS.
APPLICATION FILED JUNE 18, 1914.
1,151,406.
Patented Aug. 24, 1915.
2 SHEETS—SHEET 2.
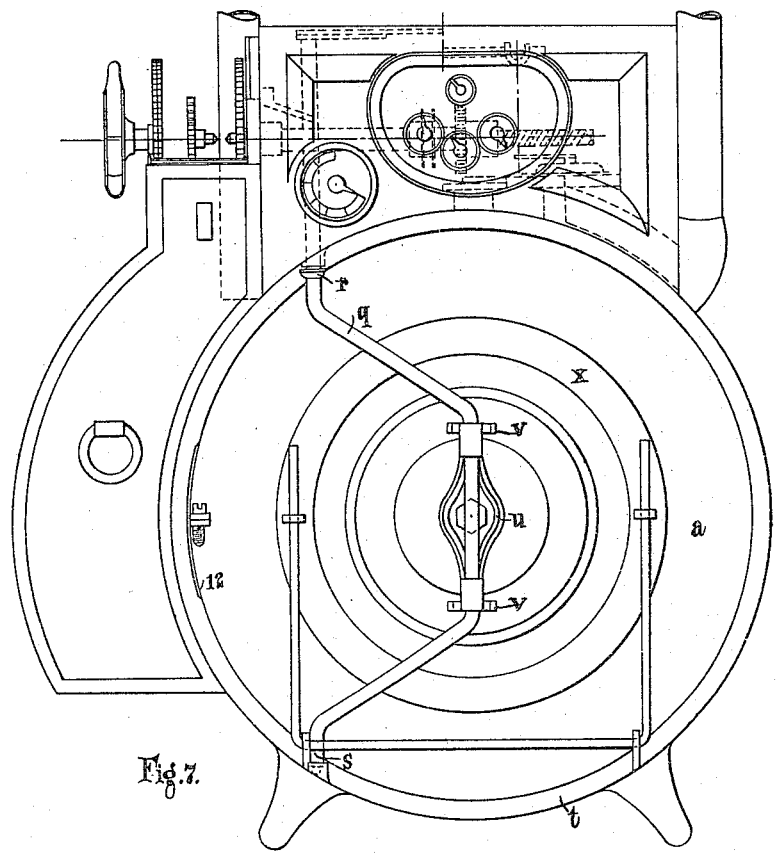
Fig. 7.
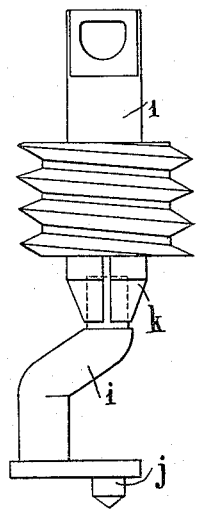
Fig. 5.
Fig. 8.
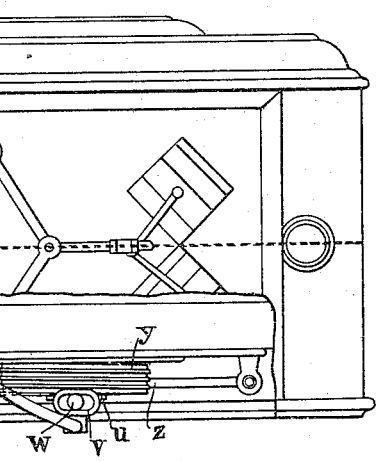
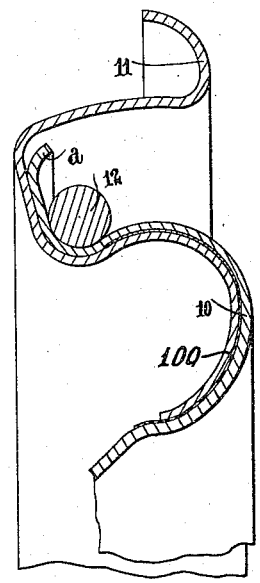
Fig. 9.
WITNESSES
E. M. Hamilton
Edw. L. Tolson
INVENTOR
Thomas Scott.
BY
Spear Middleton
ATTORNEY

UNITED STATES PATENT OFFICE.

THOMAS SCOTT, OF BIRMINGHAM, ENGLAND, ASSIGNOR TO PARKINSON AND W. & B. COWAN LIMITED, OF BIRMINGHAM, ENGLAND.

METER FOR ELASTIC FLUIDS.

1,151,406.   Specification of Letters Patent.   Patented Aug. 24, 1915.

Application filed June 18, 1914. Serial No. 845,890.

*To all whom it may concern:*

Be it known that I, THOMAS SCOTT, a subject of the King of Great Britain and Ireland, and residing at Bell Barn Road Works, Birmingham, in the county of Warwick, England, have invented certain new and useful Improvements in and Relating to Meters for Elastic Fluids, of which the following is a specification.

This invention relates to meters for elastic fluids hereinafter referred to as "gas meters" or "dry meters" and has for its main object to provide an improved construction of such meters.

The invention consists in certain features of improvements in a dry meter as regards the bellows mechanism more particularly pointed out in the claims.

Referring to the accompanying diagrammatic drawings which are not all made to the same scale:—Figures 1 and 2 show in elevation and plan respectively, the assembly of certain parts according to the present invention; Figs. 3 and 4 show an elevation and plan of a guiding dome; Fig. 5 illustrates the connection of a crank to the worm shaft; Fig. 6 shows a construction of valve stuffing box; Fig. 7 shows an elevation of a dry meter containing parts according to the present invention, a plate having been removed from the bottom part of the meter to show one of the flexible diaphragms with its associated parts. Fig. 8 is a plan of Fig. 7, some of the parts which are shown in Fig. 2 being omitted. Fig. 9 gives a form of rim against which the diaphragm is held.

In carrying the invention into effect in the form illustrated by way of example, I provide a dry gas meter of any suitable form preferably of the kind having circular diaphragms $a$ (Fig. 7) and with a common valve seat $b$ (Fig. 1) for the valves $c$ (Figs. 1 and 2) controlling distribution to the diaphragm chambers. The valves shown are two in number and have guide rods $d$ extending on both sides thereof, so that they can be guided to move with rectilinear motion.

To insure this I provide a dome or cap $e$ (Figs. 1, 3 and 4) with two sets of oppositely cut slots $f$ for coöperating with one guide rod of each valve, the other guide rods being guided in suitable slotted standards $g$.

The top of the guiding dome $e$ has a depression $h$ formed therein to receive the lower pivot $j$ of the crank $i$ (Fig. 5) driving the two valves. This crank is set into the split end $k$ of the worm shaft $l$ for communicating motion to the valves. Thus the setting of the valves can readily be adjusted and then as there is sufficient friction between the split shaft $l$ and the crank shaft $i$ the valves and shaft can be removed from the meter, and the crank soldered to the worm shaft without fear of altering the setting then or in any subsequent removal.

In connection with the driving gear of the meter I also prefer that the thrust of the gear driving the indicating mechanism shall be utilized to assist the stuffing box action where the spindle passes through the meter casing. To this end I provide the pinion spindle $m$ (Fig. 6) with a ball valve $n$ having a suitable seat $o$ and at the end $r$ constructed as a pivot, so that pressure of the gas and the thrust of the drive normally forces the pivot $r$ forward and forces the ball valve against its seat whereby good stuffing box action is obtained without undue friction.

Dealing now with the diaphragm chambers in the way illustrated in Figs. 7 and 8 I substitute for the usual flags and flag wires a crank arm $q$ pivoted at $r$ and $s$ in the casing $t$, a ball bearing preferably being provided at $s$. This crank arm $q$ is connected to a part $u$ in connection with the diaphragm by means of slotted guides $v$ carried on the arm $q$ coöperating with pins $w$ moving with the diaphragm.

In order to be able to oil the inside of the diaphragms without removing them from the meter I clamp two perforated metal disks $x$ at the center. One disk is on each side of the diaphragm $a$ so that one alone is shown. The other disk has a projecting screw threaded part $y$ which can be closed by a screw metal cap $z$. This cap may conveniently carry the two pins referred to above; for instance, these can be formed at the end of a casting $u$ movably attached to the cap so that after the cap has been screwed home to form a gas tight joint, the pin carrier can be adjusted without affecting the joint.

The particular advantage gained by the provision of a screw cap on the diaphragm disk is that when the diaphragm becomes stiff owing to long wear and the oil being extracted from the leather by the nature of the gas the diaphragm may be re-lubricated by unscrewing this cap and inserting a brush with lubricant to oil the diaphragm.

With meters as ordinarily made this is only possible by cutting a hole in the disk. There is also the additional advantage that no solder is required in the process.

For attaching the diaphragm suitably to the frame I provide a rim (Fig. 9) of such shape that the leather or like material of the diaphragm is not in contact therewith at the part 11 where the latter has to be soldered to the casing. This avoids scorching the diaphragm.

For simplicity of construction I form the rim of the diaphragm of a single ring which may be conveniently stamped and then the bead 10 formed by rolling. Some protecting layer of oiled paper or the like 100 may be placed over the bead if desired.

The ring is of more or less U-shape with extended turned over flanges and the diaphragm $a$ is gripped within the U by means of a tension wire 12.

It will be understood that modifications may be made in the construction given above.

The gear work can all be situated outside the diaphragm casing, such construction possessing certain advantages.

Meters as described above may be used for high or low pressure.

Having now described my invention what I claim as new and desire to secure by Letters Patent is:—

1. An elastic fluid meter having diaphragm chambers including a screw cap, a diaphragm, a centrally perforated metal plate disposed in the center of said diaphragm, crank members pivoted in the top and bottom of the diaphragm chambers, and bellows, with said screw cap connecting said crank members to said bellows.

2. An elastic fluid meter having diaphragm chambers including a screw cap, a diaphragm, a centrally perforated metal plate disposed in the center of said diaphragm, crank members pivoted in the top and bottom of the diaphragm chambers, bellows, with said screw cap connecting said crank members to said bellows, a part carried by said screw cap but movable in relation thereto, and means in connection therewith for coöperation with said crank members.

3. In a meter for elastic fluids having diaphragm chambers in combination crank members, pivots in the top and bottom of the diaphragm chambers, for said crank members, a screw cap and bellows, said screw cap forming a connection between said crank members and said bellows.

4. An elastic fluid meter including in combination a flexible diaphragm, a metal plate attached thereto with an upstanding screwed flange and a screw cap adapted to screw on said flange.

5. An elastic fluid meter including distribution valves, operating rods for said valves, a dome-shaped standard with guideways extending across two diameters at right angles forming guides for said rods, means for operating said rods and a seating in the top of said standard forming a bearing for said means.

6. An elastic fluid meter including valves and valve operating means comprising a spindle with a split end, a worm mounted on said spindle and a crank arm forced into said split end.

7. An elastic fluid meter including a spindle, gear teeth formed thereon and a spherical valve also formed thereon, a casing perforated for the passage of said spindle and containing a seating for the valve, the gear teeth being so disposed that the drive tends to force the valve against the seating.

8. An elastic fluid meter including a flexible diaphragm and a rim on which said diaphragm is mounted, said rim being formed with a roller bead, a wire extending around the rim and means for tensioning said wire to clamp the diaphragm close to the rim.

In testimony whereof, I affix my signature in presence of two witnesses.

THOMAS SCOTT.

Witnesses:
J. A. WALTERS,
ALBERT J. WEST.

Copies of this patent may be obtained for five cents each, by addressing the "Commissioner of Patents, Washington, D. C."